United States Patent
Naito et al.

[11] Patent Number: 5,890,777
[45] Date of Patent: Apr. 6, 1999

[54] ANTISKID CONTROL DEVICE

[75] Inventors: Takeshi Naito, Anjo; Akitaka Nishio, Okazaki, both of Japan

[73] Assignee: Aisin Seiki Kabushiki Kaisha, Kariya, Japan

[21] Appl. No.: 749,234

[22] Filed: Nov. 15, 1996

[30] Foreign Application Priority Data

Nov. 17, 1995 [JP] Japan .................................. 7-300201

[51] Int. Cl.⁶ ...................................................... B60T 8/58
[52] U.S. Cl. .......................... 303/156; 303/167; 303/181
[58] Field of Search .................................. 303/3, 15, 20, 303/113.1, 115.1, 113.5, 188, 166, 160, 157, 158, 156, 167, 178, 181, 183

[56] References Cited

U.S. PATENT DOCUMENTS

| | | | |
|---|---|---|---|
| 3,663,068 | 5/1972 | Sharp | 303/113.1 |
| 3,833,269 | 9/1974 | Trui et al. | 303/115.1 |
| 4,912,641 | 3/1990 | Kuwana et al. | |
| 5,220,506 | 6/1993 | Kuwana et al. | |
| 5,257,192 | 10/1993 | Masaki | |
| 5,348,380 | 9/1994 | Korasiak et al. | |

FOREIGN PATENT DOCUMENTS

| | | |
|---|---|---|
| 40 21 993 | 1/1991 | Germany . |
| 40 12 167 | 10/1991 | Germany . |
| 44 03 445 | 8/1995 | Germany . |
| 44 45 512 | 8/1995 | Germany . |
| 40 36 434 | 8/1997 | Germany . |
| 8-34329 | 2/1996 | Japan . |
| 9-508334 | 8/1997 | Japan . |

*Primary Examiner*—Lee W. Young
*Attorney, Agent, or Firm*—Burns, Doane, Swecker & Mathis, LLP

[57] ABSTRACT

According to the present invention, the gradient of duty pressure increase can be adjusted to a best possible value even when an M/C pressure has varied. For example, duty ratio is set to a first set value when a difference between the M/C pressure and a wheel locking pressure is equal to or larger than a predetermined value and to a second set value for a longer pressure increase duration when the difference is smaller than the predetermined value. Then, a brake fluid pressure control valve is operated so that the duty pressure can be increased according to the duty ratio.

7 Claims, 7 Drawing Sheets

ANTISKID CONTROL DEVICE

FIELD OF THE INVENTION

The present invention relates to a wheel braking system, and more particularly to an antiskid control device for an automotive vehicle for reducing pressure and increasing duty pressure.

BACKGROUND OF THE INVENTION

One kind of antiskid control device is disclosed in U.S. Pat. No. 4,912,641. This device comprises wheel brakes for applying braking force to wheels of a vehicle, a master cylinder for generating brake fluid pressure corresponding to the extent to which a brake pedal is depressed and for transmitting the brake fluid pressure to the wheel brakes, brake fluid pressure control valves interposed between the wheel brakes and the master cylinder, wheel speed detection devices for detecting the rotational speeds of the wheels, and a controller for operating the brake fluid pressure control valves so that the brake fluid pressure is reduced and duty pressure is increased in response to output signals from the wheel speed detection devices.

This control device is designed to be capable of detecting the condition in which the wheels tend to be locked before starting the antiskid control and repeating the control for reducing the pressure and increasing the duty pressure to prevent the wheels from being locked. With this device, when it is determined that the duty pressure should be increased, the duty pressure increase operation is executed repeatedly (the duty pressure increase process comprises the duration of duty pressure increase and the duration of pressure reduction, and the sum of them is constant), and the duty ratio (the ratio of the duration of duty pressure increase to the duration of pressure reduction) is set so that the duration of the duty pressure increase becomes gradually longer. Furthermore, when the necessity of pressure reduction is determined after the duty pressure increase control has been executed, the initial value of the duty ratio in the next duty pressure increase control is increased or decreased depending on a period or a duration of the preceding duty pressure increase control so that the pressure increase gradient can be properly compensated.

Such a conventional device, however, is not designed so that the duty ratio for controlling the duty pressure increase can be varied according to the difference between the braking pressure generated by the master cylinder (hereinafter referred to as M/C pressure) and a locking pressure which causes the wheels to be locked.

Thus, in the situation where the duty ratio is set for a relatively short duration of pressure increase, when the M/C pressure is at a high level (or when the difference between M/C pressure and the locking pressure is relatively large), there is a large difference between the M/C pressure and the braking pressure of the wheels, and thus a necessary pressure increasing gradient can be obtained. However, when the M/C pressure is close to the locking pressure (or when the difference between the M/C pressure and the locking pressure is relatively small), the difference between the M/C pressure and the braking pressure applied to the wheels also becomes smaller. Thus, when the duty ratio is left unmodified, the pressure increase gradient becomes too gentle, thereby giving rise to problems such as pressure increase delay or a longer braking distance.

On the other hand, in the case where the duty ratio is set so that the duration of pressure increase becomes longer, when the M/C pressure is close to the locking pressure, the necessary pressure increase gradient can be obtained, but if the M/C pressure is too high, the pressure increase gradient becomes too steep. Consequently, the wheels become more likely to be locked as a resultant problem.

SUMMARY OF THE INVENTION

In light of the foregoing, a need exists for an antiskid control device that is not susceptibly of the same problems as those identified above.

The antiskid control device according to the present invention includes a wheel brake for applying braking force to a wheel of a vehicle, a master cylinder for generating brake fluid pressure corresponding to depression of a brake pedal and for applying the brake fluid pressure to the wheel brake, a pressure control valve interposed between the wheel brake and the master cylinder to control the brake fluid pressure applied to the wheel brake, a wheel speed sensor for detecting the rotational speed of the wheel and a controller for controlling the pressure control valve in response to an output signal from the wheel speed sensor to alternatively establish a duty-cycle pressure-increase mode operation for increasing the brake fluid pressure in the wheel brake gradually and a pressure-decreasing mode operation for decreasing the brake fluid pressure in the wheel brake.

The controller includes a difference determination mechanism for determining whether or not a difference between the brake fluid pressure generated by the master cylinder and a locking pressure for causing the wheel to be locked is equal to or larger than a predetermined value, a duty ratio setting arrangement for setting a duty ratio in the duty-cycle pressure-increase mode operation to a first set value if the difference is found to be equal to or larger than the predetermined value by the difference determination mechanism and for setting the duty ratio to a second set value which allows a pressure increase operation to last longer than in the case of the first set value if the difference is found smaller than the predetermined value by the difference determination mechanism and a duty pressure increasing device for controlling the pressure control valve in order to increase the brake fluid pressure in the wheel brake according to the duty ratio set by the duty ratio setting arrangement.

When the difference between the brake fluid pressure generated by the master cylinder (hereinafter referred to as M/C pressure) and the wheel locking pressure is equal to or larger than the predetermined value, the duty ratio is set to the first set value, and when the difference is smaller than the predetermined value, the duty ratio is set to the second set value which corresponds to a longer duration of pressure increase.

When the difference between the M/C pressure and the locking pressure is equal to or larger than the predetermined value, this causes not only a differential pressure between the M/C pressure and the braking pressure applied to the wheels to increase but also the duty ratio is set for shorter pressure increase duration, so that an optimum (increasing) gradient can be obtained. On the other hand, when the difference between the M/C pressure and the locking pressure is smaller than the predetermined value, the differential pressure between the M/C pressure and the braking pressure becomes smaller, but the duty ratio is set for a relatively longer pressure increase duration, so that an optimum pressure increasing gradient can be obtained.

Thus, even when the difference between the M/C pressure and the locking pressure varies, an appropriate gradient for the duty pressure increase can be obtained. As a result, the braking distance during the antiskid control can be shortened, and the chances of the wheel locking during the control for the duty pressure increase can be minimized.

It is preferable that the controller include a difference determination mechanism capable of determining whether or not the difference between the reference deceleration of the vehicle and the present deceleration of the vehicle is equal to or larger than a predetermined level while the controller is in operation for increasing the duty pressure so that when the difference is equal to or larger than the predetermined level, the difference between the brake fluid pressure in the master cylinder and the locking pressure is determined to be smaller than the predetermined value, and when the difference is smaller than the predetermined level the difference between the brake fluid pressure in the master cylinder and the locking pressure is determined to be equal to or larger than the predetermined value.

According to this construction, it is possible to determine whether or not the difference between the M/C pressure and the locking pressure is equal to or larger than the predetermined value by referring to whether or not the difference between the reference deceleration of the vehicle and the actual deceleration during the antiskid control is equal to or larger than the predetermined level. That is, depending on whether or not the deceleration of the vehicle has become extremely small. This construction is cost-saving, since it does not require any extremely costly sensors such as an M/C pressure detection sensor or a braking pressure sensor for wheels.

According to another aspect of the present invention, an antiskid control device includes a wheel brake for applying braking force to a wheel of a vehicle, a master cylinder for generating brake fluid pressure corresponding to depression of a brake pedal and for applying the brake fluid pressure to the wheel brake, a pressure control valve interposed between the wheel brake and the master cylinder to control the brake fluid pressure applied to the wheel brake, and a wheel speed sensor for detecting rotational speed of the wheel. A vehicle deceleration sensor detects the vehicle deceleration of the vehicle, and a controller controls the pressure control valve in response to an output signal from the wheel speed sensor to alternatively establish a duty-cycle pressure-increase mode operation for increasing the brake fluid pressure in the wheel brake gradually and a pressure-decreasing mode operation for decreasing the brake fluid pressure in the wheel brake. The controller includes an arrangement for determining whether a difference between a vehicle deceleration reference value and the vehicle deceleration detected by the vehicle deceleration sensor is larger than a predetermined first value, and an arrangement for determining that a difference between the brake fluid pressure generated by the master cylinder and a locking pressure which causes the wheel to be locked is less than a predetermined second value when the difference between the vehicle deceleration reference value and the vehicle deceleration detected by the vehicle deceleration sensor is larger than the predetermined first value and for determining that the difference between the brake fluid pressure generated by the master cylinder and the locking pressure which causes the wheel to be locked is greater than the predetermined second value when the difference between the vehicle deceleration reference value and the vehicle deceleration detected by the vehicle deceleration sensor is smaller than the predetermined first value.

DESCRIPTION OF PREFERRED EMBODIMENT

Figure 1:
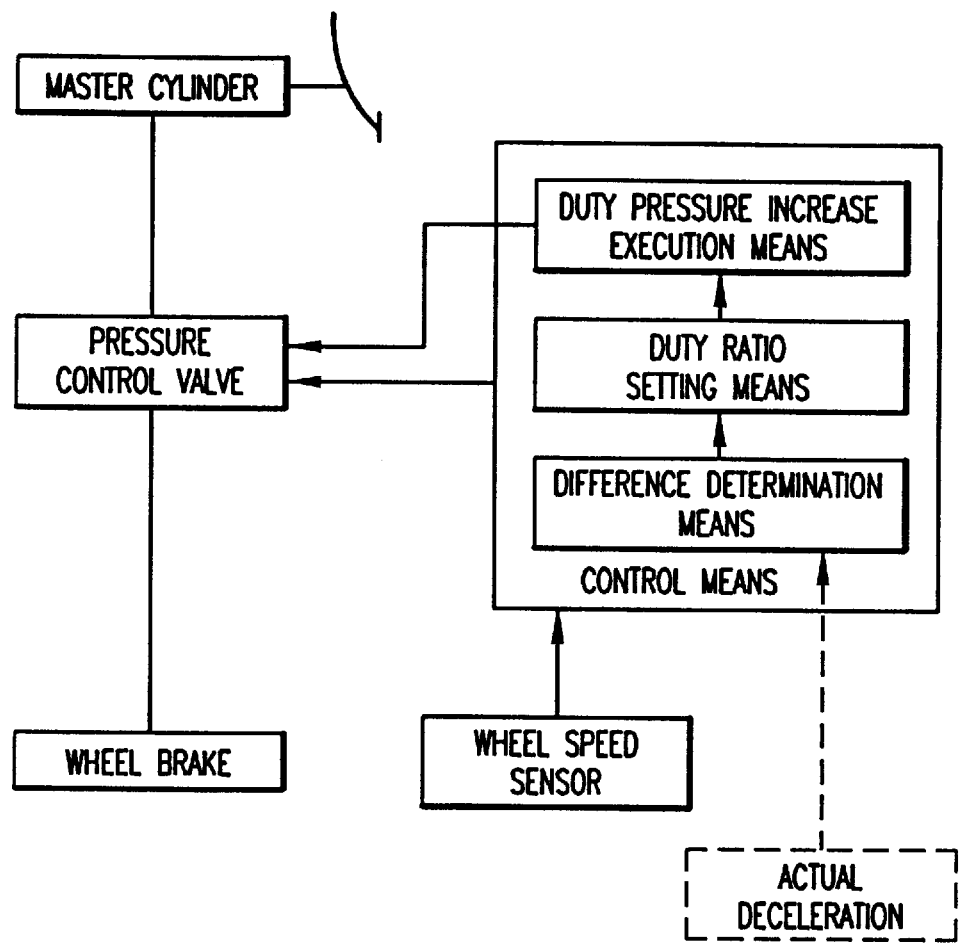
FIG. 1 is a block diagram schematically illustrating the present invention.

As seen with reference to FIG. 1, the antiskid control system of the present invention includes control means provided with a difference determination means, a duty ratio setting means, and a duty pressure increase execution means, all of which are described below in more detail. A master cylinder is connected to the wheel brakes in a manner that is described below in more detail and a series of pressure control valves are interposed between the master cylinder and the wheel brakes. The control means as well as the duty pressure increase execution means are connected to the pressure control valves, and the control means is provided with input from wheel speed sensors associated with the wheels. The difference determination means forming a part of the control means is provided with input with respect to the deceleration of the vehicle.

According to the present invention, the reference deceleration of a vehicle corresponds to the deceleration of the vehicle at the initiation of the deceleration of the vehicle at the start of the duty pressure increase immediately after the start of the control for duty pressure increase (at the time of the initial determination). Later on, the deceleration is adjusted to the deceleration at the time of determination each time the deceleration is determined to have become larger than the reference deceleration. Besides, the actual deceleration may be determined either by the output signal from a deceleration detection means designed for detecting the deceleration of the vehicle, if provided, or by calculation based on the rotational speeds of the wheels, but the former method is preferable for obtaining the deceleration with higher accuracy.

Figure 2:
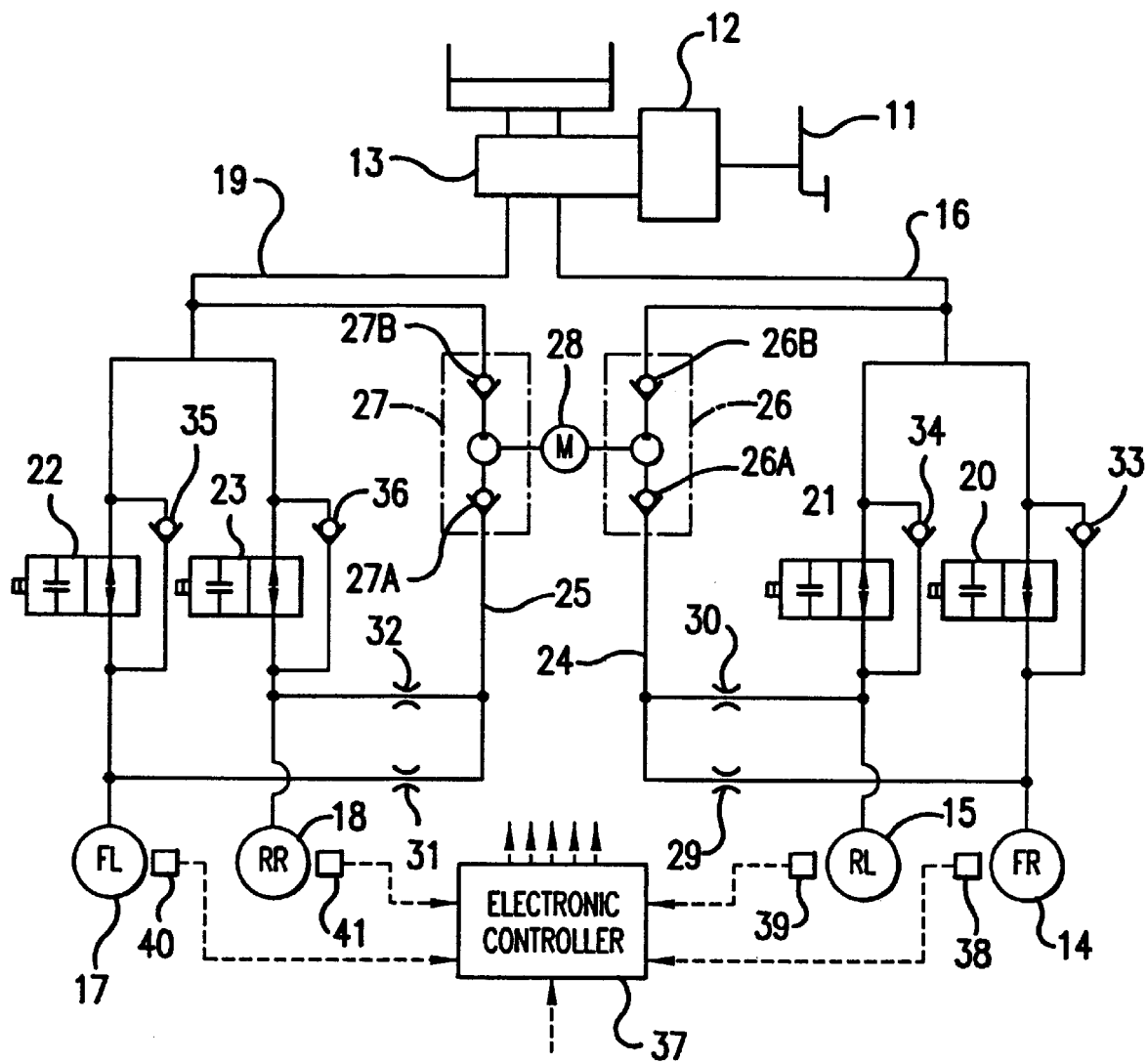
FIG. 2 is a schematic illustration of the antiskid control system according to the present invention.

As illustrated in FIG. 2, the brake system includes a tandem type master cylinder 13 provided with two pressure chambers. The brake operating force applied to the brake pedal 11 is doubled by a negative pressure type toggle joint 12 and is applied to the tandem type master cylinder 13. The right-front-wheel brake 14 and the left-rear-wheel brake 15 are hydraulically connected to one of the two pressure chambers within the tandem type master cylinder 13 through a first main passage 16. Also, the left-front-wheel brake 17 and right-rear-wheel brake 18 are hydraulically connected to the other of the two pressure chambers within the master cylinder 13 through a second passage 19.

A first ordinary type electromagnetic valve (brake fluid pressure control valve) 20 for separating only the right-front-wheel brake 14 from the one pressure chamber of the master cylinder 13 and a second ordinary type electromagnetic valve (brake fluid pressure control valve) 21 for separating only the left-rear-wheel brake 15 from the one pressure chamber of the master cylinder 13 are respectively provided at the middle of the first main passage 16.

Similarly, a third electromagnetic valve (brake fluid pressure control valve,) 22 for separating only the left-front-wheel brake 17 from the other pressure chamber of the master cylinder 13 and a fourth electromagnetic valve (brake fluid pressure control valve) 23 for separating only the right-rear-wheel brake 18 from the other pressure chamber of the master cylinder 13 are respectively provided at the middle of the second main passage 19.

The first main passage 16 is connected to a first flux or flow passage 24 so that the brake fluid in the right-front-wheel brake 14 and the left-rear-wheel brake 15 can be returned to the main passage 16 at a point between the electromagnetic valves 20 and 21 and the master cylinder 13 without passing through the electromagnetic valves 20 and 21. Similarly, the second main passage 19 is connected to a second flux or flow passage 25 so that the brake fluid in the left-front-wheel brake 17 and the right-rear-wheel brake 18 can be returned to the main passage 19 at a point between the electromagnetic valves 22 and 23 and the master cylinder 13 without passing through the electromagnetic valves 22 and 23.

The first flow passage 24 is provided with a first hydraulic pump 26 for sending pressurized brake fluid to the master cylinder 13 from the right-front-wheel brake 14 and the left-rear-wheel brake 15. Similarly, the second flow passage 25 is provided with a second hydraulic pump 27 for sending pressurized brake fluid to the master cylinder from the left-front-wheel brake 17 and the right-rear-wheel brake 18. These two hydraulic pumps 26 and 27 are driven by a common motor 28. The hydraulic pump 26 includes an intake valve 26A and a discharge valve 26B, while the hydraulic pump 27 includes an the intake valve 27A and a discharge valve 27B.

A first orifice 29 is provided between the right-front-wheel brake 14 and the intake valve 26A in the first flow passage 24. The first orifice 29 is designed to reduce or raise the pressure of the brake fluid in the right-front-wheel brake 14 in response to the operation or ceasing of operation of the first electromagnetic valve 20 while the master cylinder 13 and the first hydraulic pump 26 are in operation. Furthermore, a second orifice 30 is provided between the left-rear-wheel brake 15 and the intake valve 26A in the first flow passage 24. The second orifice 30 is designed to reduce or raise the brake fluid pressure in the left-rear-wheel brake 15 in response to the operation or ceasing of operation of the second electromagnetic valve 21 while the master cylinder 13 and the first hydraulic pump 26 are in operation.

A third orifice 31 is provided between the right-front-wheel brake 14 and the intake valve 26A in the first flow passage 24. The third orifice 32 is designed to reduce or raise the brake fluid pressure in the right-front-wheel brake 14 in response to the operation and the ceasing of operation of the first electromagnetic valve 20 while the master cylinder 13 and the first hydraulic pump 20 are in operation. Further, a fourth orifice 32 is installed between the right-rear-wheel brake 18 and the intake valve 27A in the second flow passage 25. The fourth orifice 32 is designed to reduce or raise the brake fluid pressure in the right-rear-wheel brake 18 in response to the operation and the ceasing of operation of the fourth electromagnetic valve 23 while the master cylinder 13 and the second hydraulic pump 27 are in operation.

The first main passage 16 includes check valves 33 and 34 connected in parallel with the electromagnetic valves 20 and 21. The check valves 33 and 34 are designed to reduce the brake fluid pressure in the right-front-wheel brake 14 and the left-rear-wheel brake 15 to the level of the hydraulic pressure of one of the pressure chambers of the master cylinder when the hydraulic pressure of that one of the pressure chambers of the master cylinder 13 has dropped below the brake fluid pressures of the right-front-wheel brake 14 and the left-rear-wheel brake 15. Similarly, the second main passage 19 includes check valves 35 and 36 connected in parallel with the electromagnetic valves 22 and 23. The check valves 35 and 36 are designed to reducing the brake 17 fluid pressures of the left-front-wheel brake 18 and the right-rear-wheel brake to the level of the hydraulic pressure of the other pressure chamber of the master cylinder 13 when the hydraulic pressure of that other pressure chamber of the master cylinder 13 has dropped below the brake fluid pressures of the left-front-wheel brake 17 and the right-rear-wheel brake 18.

As illustrated in FIG. 2, when the brake pedal 11 is depressed, the master cylinder 13 is actuated causing one of the pressure chambers of the master cylinder 13 to supply brake fluid to the right-front-wheel brake 14, sequentially passing the first main passage 16 and the first electromagnetic valve 20, and to the left-rear-wheel brake 15, sequentially passing the first main passage 16 and the second electromagnetic valve 21. At the same time, the other pressure chamber of the master cylinder 13 supplies brake fluid to the left-front wheel brake 17, sequentially passing the second main passage 19 and the third electromagnetic valve 22, and to the right-rear-wheel brake 18, sequentially passing the second main passage 19 and the fourth electromagnetic valve 23. Thus, the braking force corresponding to the brake fluid pressure is applied to the right front wheel FR, the left rear wheel RL, the left front wheel FL, and the right-rear wheel RR to brake the wheels.

During the braking action, the brake fluid pressures in the right-front-wheel brake 14, the left-rear-wheel brake 15, the right-front-wheel brake 17, and the left-rear-wheel brake 18 can be reduced or increased by operating or stopping the operation of the electromagnetic valves 20 through 23 after starting the motor 28 to actuate the hydraulic pumps 26, 27. When the hydraulic pump 26 is actuated, the pump 26 starts to supply pressurized brake fluid from its intake side to its discharge side, whereby the brake fluid in the right-front-wheel brake 14 flows into the intake side of the hydraulic pump 26 through the orifice 29, and the brake fluid in the left-rear-wheel brake 15 flows into the intake side of the hydraulic pump 26 through the orifice 30. The brake fluid flowing out from the right-front-wheel brake 14 and the left-rear-wheel brake 15 into the hydraulic pump 26 is returned to the main passage 16 at a point between the electromagnetic valves 20, 21 and the master cylinder 13 by the hydraulic pump 26, and further flows into the wheel brake 14 and 15 by way of the electromagnetic valves 20, 21.

The sizes of the orifices 29 and 30 are so determined that the amount of brake fluid flowing out of the orifices 29, 30 respectively after being supplied from the wheel brakes 14 and 15 is smaller than the amount of brake fluid flowing into the wheel brakes 14, 15. Thus, the brake fluid pressure in the wheel brake 14 can be reduced by closing the electromagnetic valve 20 while the hydraulic pump 26 is in operation. Similarly, the brake fluid pressure in the wheel brake 15 can be reduced by closing the electromagnetic valve 21 while the hydraulic pump 26 is in operation. On the contrary, the brake fluid pressure in the wheel brake 14 can be increased by opening the electromagnetic valve 20 while the hydraulic pump 26 is in operation. Similarly, the brake fluid pressure in the wheel brake 15 can be increased by opening the electromagnetic valve 21 while the hydraulic pump 26 is in operation. Furthermore, the brake fluid pressures, as duty pressures, in the wheel brakes 14 and 15 can be separately increased (or increased with a mild gradient) by operating the electromagnetic valves 20, 21 in the duty mode.

In a similar manner, the brake fluid pressures in the wheel brakes 17, 18 can be separately reduced, increased or increased in the duty mode by setting the electromagnetic valves 22, 23 in operation, out of operation or in the duty-mode operation respectively while the hydraulic pump 21 is in operation.

The electromagnetic valves 20 through 23 and the motor are connected to an electronic controller 37 and are thereby driven. The right-front wheel FR to be braked by the right-front-wheel brake 14, the left-rear wheel RL to be braked by the left-rear-wheel brake 15, the left-front wheel FL to be braked by the left-front-wheel brake 17, and the right-rear wheel RR to be braked by right-rear-wheel brake 18 are respectively provided with wheel speed sensors (or wheel speed detection means) 38, 39, 40 and 41 which are respectively connected to the electronic controller 37.

Figure 3:
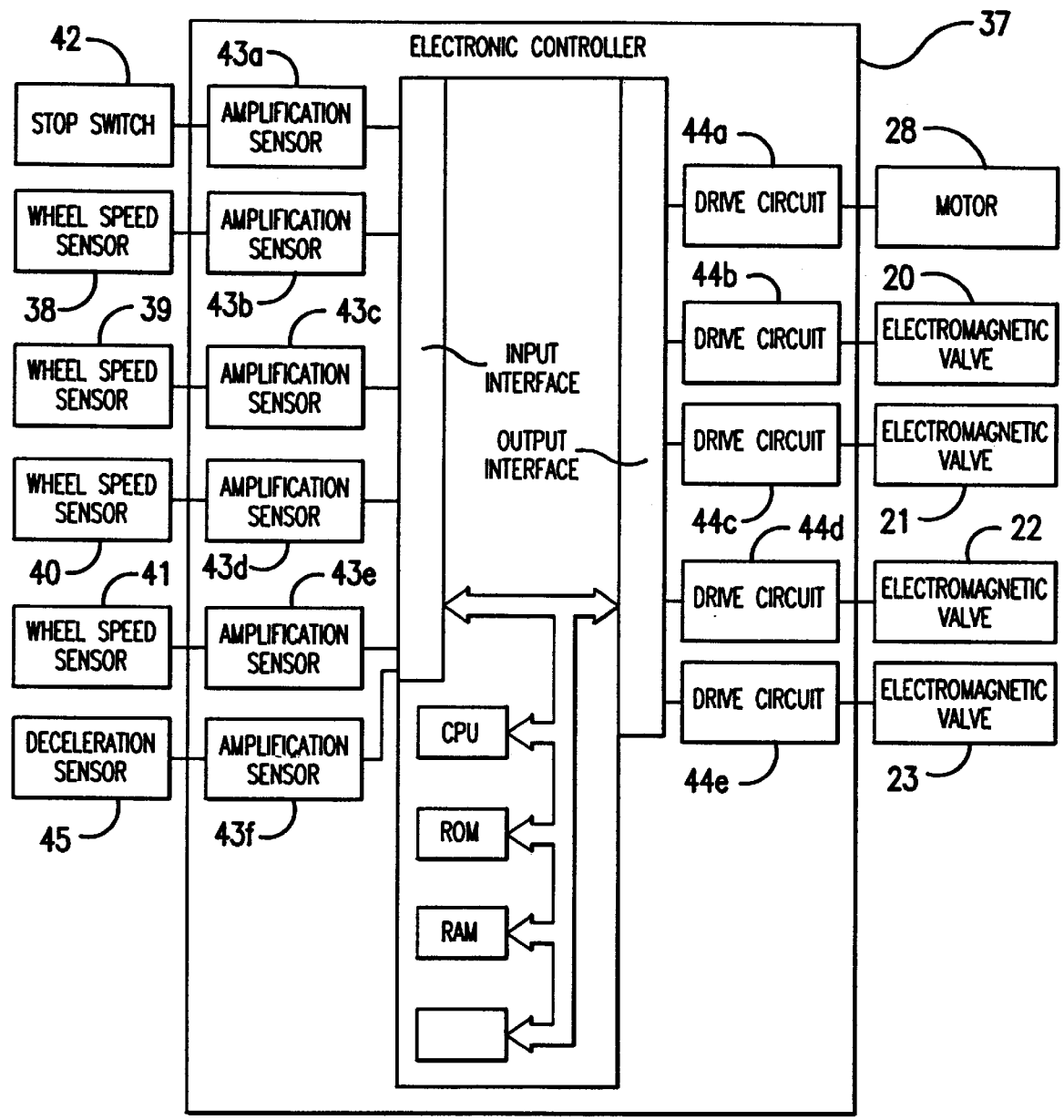
FIG. 3 is a block diagram illustrating features of the electronic control device.
Figure 4:
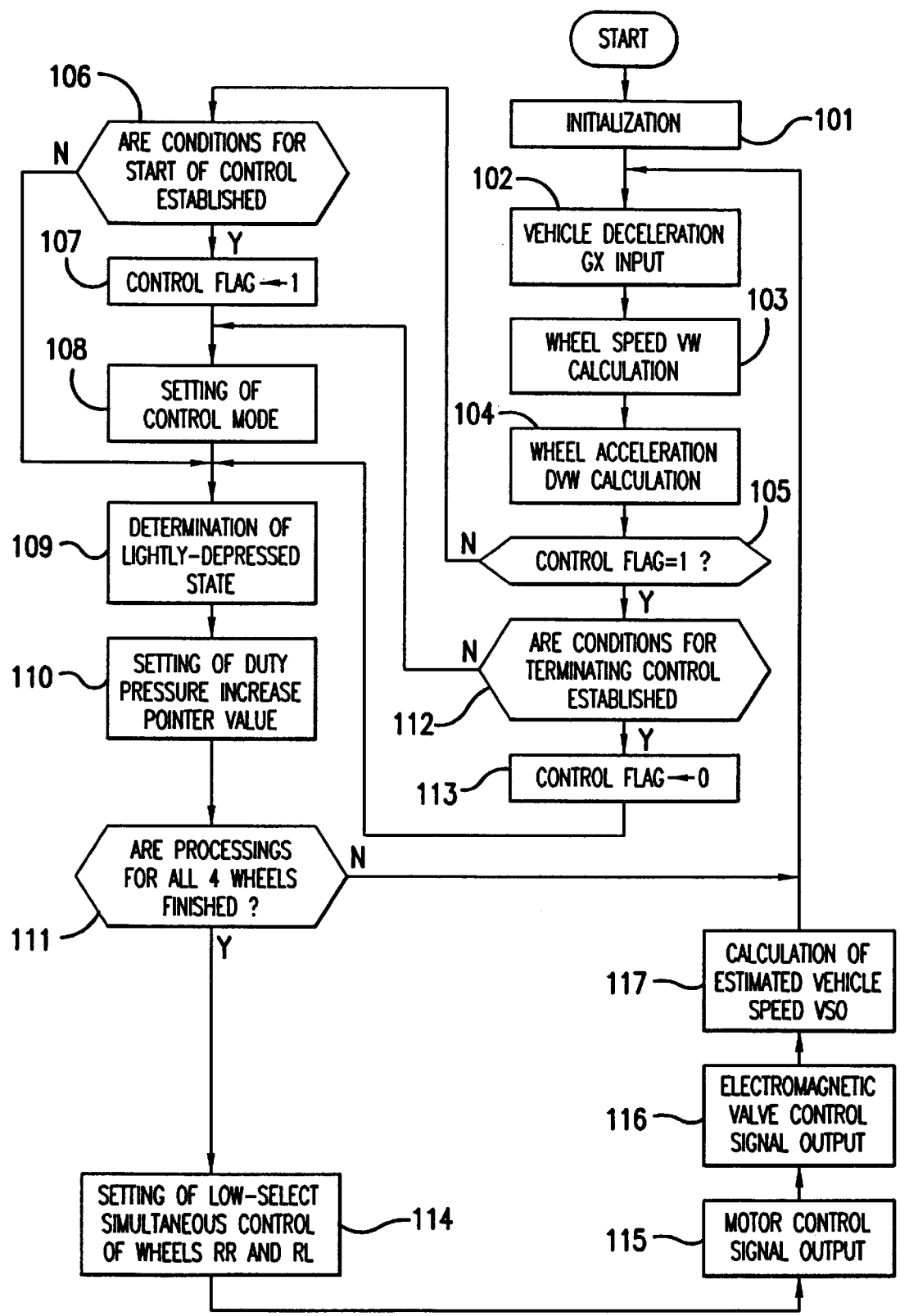
FIG. 4 is a flowchart showing the main routine of the antiskid control according to the present invention.

The electronic controller 37, as shown in FIG. 3, comprises a microcomputer having a CPU, a ROM, a RAM, a timer, an input interface and an output interface which are connected with one another through a bus. The output signals from the stop switch 42, designed to be turned on when the brake pedal 11 is depressed, from the wheel speed sensors 38–41 and from the deceleration sensor 45 are input, from their respective input interfaces, to the CPU through amplification circuits 43a–43f. Furthermore, the output interface outputs control signals to the motor 28 through drive circuit 44a and outputs drive signal to the electromagnetic valves 20 through 23 by way of drive circuits 44b–44e. In the microcomputer, the ROM stores the program corresponding to the flowchart as shown in FIG. 4, the CPU executes the program while the ignition switch (not shown) is closed, and the RAM temporarily stores the data of variables necessary for the execution of the program.

According to the present embodiment constructed as described above, when the ignition switch (not shown) is opened, the execution of the program corresponding to the flowchart is started. First, the microcomputer is initialized in step 101 shown in FIG. 4, thereby clearing various operational values, the estimated vehicle body speed VSO corresponding to the vehicle speed, the wheel speeds VW of individual wheels (right-front wheel FR, left-front wheel FL, right-rear wheel RR and left-rear wheel RL), the wheel acceleration DVW, etc. Then, in step 102, the deceleration Gx from deceleration sensor 45 is input to the electronic controller 37 and in step 103, the wheel velocity VW of each wheel is calculated in response to the output signal from the wheel speed sensors 38–41. The program then proceeds to step 104 where the wheel acceleration DVW of each wheel is calculated.

Then the program proceeds to step 105 to determine whether or not the flag indicative of the control of each wheel (or during the antiskid control) is 1. If not, it is determined in step 106 whether or not the conditions for starting the control are established based on the signal from the stop switch, the wheel speed VW, the wheel acceleration DVW and the estimated vehicle body speed DVW. When the control start conditions are established, the program proceeds to step 107, and the flag is set to 1 during the processing in this step. However, the program jumps directly to step 109 from step 106 if the control start conditions are not established.

Then, the program proceeds to step 108 where the control mode of each wheel is set to any one of the pressure reduction mode, the duty pressure increase mode, and the pressure increase mode before proceeding to step 109. On the other hand, when the flag is found to be 1 during the control in step 105, that is when the antiskid control is found to be in progress, it is determined in step 112 whether or not the control terminating conditions (antiskid control terminating conditions) are established. If not, the program proceeds to step 108 to set the previously described control mode. On the other hand, when the control terminating conditions are found to have been established in step 112, the flag is reset to 0, and the program proceeds to step 109.

In step 109 the inadequately or lightly depressed condition, which will be described later, is determined. In step 110 the duty pressure increase pointer, which will be described later, is set and the program proceeds to step 111. The processings in step 102 through step 113 are executed with respect to the individual wheels. When the processings for all the four wheels are found completed in step 111, the program proceeds to step 114 where the setting is made for simultaneous control of the wheels RR and RL for selecting low levels. In step 115, the control signal for the motor is output as is step 116, the control signal for the electromagnetic valve is output. In step 117, the estimated vehicle body speed VSO is calculated and the program then returns to step 102.

As mentioned above, it is determined in step 108 which of the pressure reduction mode, the duty pressure increase mode and the pressure increase mode has been set as the control mode for the wheels RR and RL. If the pressure reduction mode has been set (for any one of the wheels RR and RL), it is determined that the pressure reduction mode has been set for both the wheels, while if the pressure reduction mode has not been set for both wheels but the duty pressure increase mode has been set for any one of the wheels, it is determined that the duty pressure increase has been set for both the wheels. As shown in step 115 of FIG. 4, the motor 28 is electrified when any one of the flags has become 1 while the four wheels are under control, whereas the motor 28 is unelectrified when all the flags have become 0 while the four wheels are under control.

Referring to step 116 of FIG. 4, with respect to the wheels FR and FL, the control signal corresponding to the control mode set in step 108 (e.g., continuous electrification signal in the case of pressure reduction mode, continuous unelectrification signal in the case of pressure increase mode, and duty electrification signal in the case of duty pressure increase mode) is output to the electromagnetic valves corresponding to the wheels to be controlled (e.g., electromagnetic valve 20 where the wheel to be controlled is the wheel FR). With respect to the wheels RR and RL, on the other hand, the control signal corresponding to the control mode set in step 114 is output (e.g,. continuous electrification signal in the case of pressure reduction mode, continuous unelectrification signal in the case of pressure increase mode, and duty electrification signal in the case of duty pressure increase mode).

Figure 5:
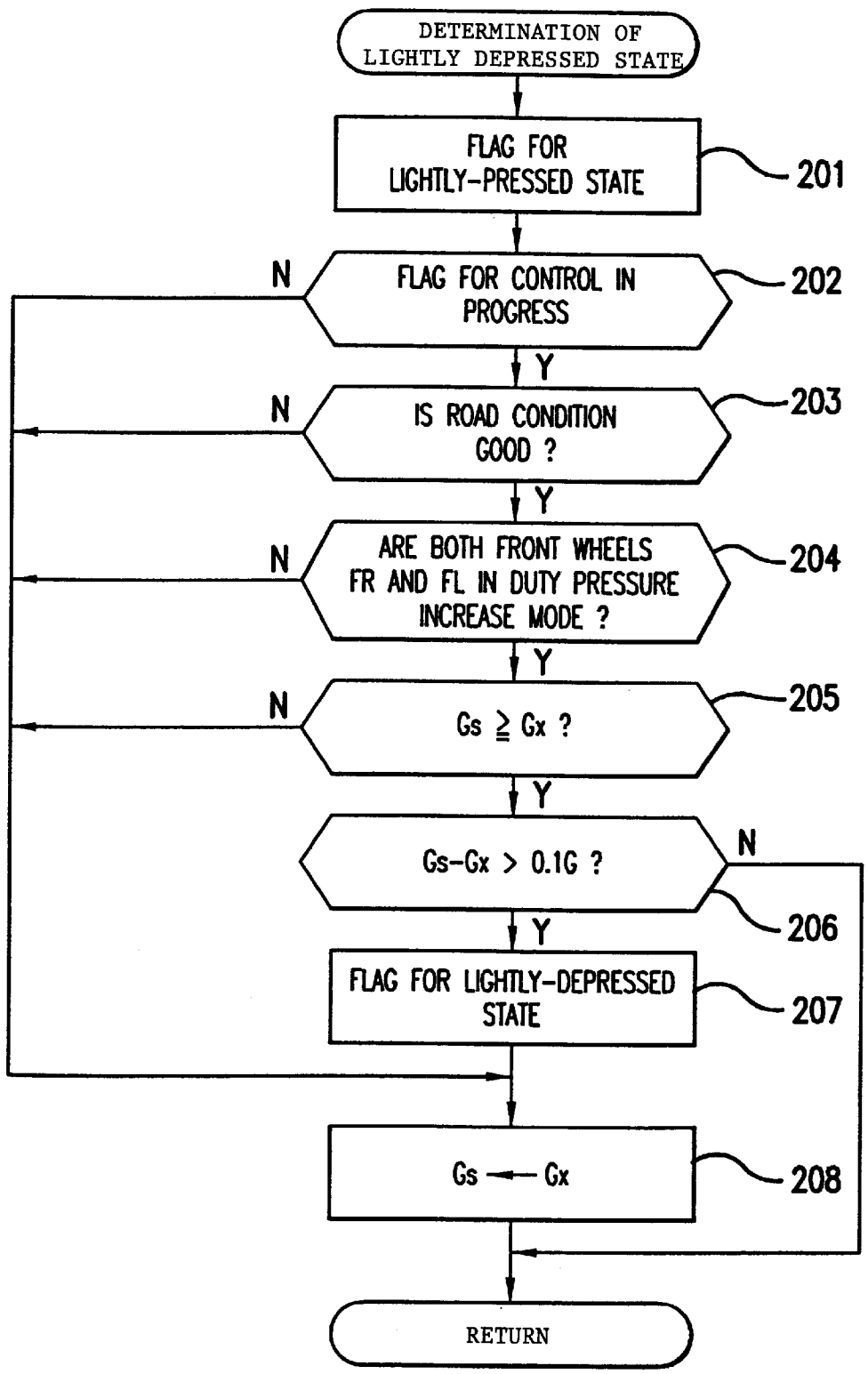
FIG. 5 is a flowchart illustrating the routine for determining that the brake pedal is depressed lightly.

FIG. 5 illustrates the procedure for determining the lightly-depressed state in step 109 of FIG. 4. First, in step 201, the flag corresponding to the lightly-depressed position is set to 0. In this case, reference to the flag for the lightly-depressed condition being 0 means that the extent of depression of the brake pedal 11, that is the depressing force applied to the brake, is relatively large and the difference between the brake fluid pressure of the master cylinder 13 (M/C pressure) and the locking pressure of the wheel is larger than a predetermined value (a value a little larger than 0).

Next, in step 202, it is determined whether or not the flag for the lightly-depressed state is 1 during the control. If so, the program proceeds to step 203. If not, the program jumps to step 208. In step 203, the condition of the road surface (whether the road condition is good or poor) is judged. If the road condition is good, the program proceeds to step 204. If the road condition is poor, the program jumps to step 208. In step 204, it is determined whether both front wheels FR, FL are in the duty pressure increase mode and if so, the program proceeds to step 205. If it is determined in step 204 that both front wheels FR, FL are not in the duty pressure increase mode, the program jumps to step 208.

In step 205, it is determined whether the vehicle deceleration Gx is equal to or smaller than the reference value Gs of the vehicle deceleration. If so, the program proceeds to step 206. If not, the program jumps to step 208. In this case, the vehicle deceleration, which is input from the deceleration sensor 45 instantaneously following the initial setting of the duty pressure increase mode, is used as the reference value Gs of the vehicle deceleration, and the present deceleration is updated each time the determination is made and with respect to the predetermined case.

In step 206, it is determined whether or not the difference between the reference value Gs of the vehicle deceleration and the present vehicle deceleration Gx is larger than the predetermined value (0.1 G in this case), that is whether or not the reducing gradient of vehicle deceleration is markedly steep. If so, the flag corresponding to the lightly-depressed position is set to 1 in step 207. If not, the program returns to the main routine shown in FIG. 4, with the flag identifying the lightly-depressed position being left unchanged. That is, when the difference between the reference value Gs of the vehicle deceleration and the present vehicle deceleration Gx is larger than 0.1 G, it is determined that the difference between the M/C pressure and the locking pressure of the vehicle has become lower than the predetermined value, or that the lightly-depressed position or state exists. On the other hand, when the difference between the reference value Gs of the vehicle deceleration and the present vehicle deceleration Gx is smaller than 0.1 G, it is determined that the difference between the M/C pressure and the locking pressure of the wheel is larger than the predetermined value or that the strongly-depressed position or state is in existence. Finally, in step 208, the reference value Gs of the vehicle deceleration is updated to the present vehicle deceleration Gx.

As described previously concerning how to determine the existence of the lightly-depressed state as shown in FIG. 5, during ABS control under good road conditions, it is determined that a lightly-depressed state (the condition in which the M/C pressure is near the locking pressure) is in existence when the duty pressure increase mode is set for both the front wheels, and the difference between the reference value Gs of the vehicle deceleration and the present vehicle deceleration Gx is larger than 0.1, whereas it is determined that a strongly-depressed state is in existence under conditions other than those identified above. In this case, when the road conditions are determined to be bad, it is determined that a lightly-depressed state is not in existence. In other words, it is determined that a lightly-depressed state is in existence only when the road condition is determined to be good, so that the lightly-depressed condition is determined to exist only when the deceleration sensor can operate with high accuracy. As a result, the existence of the lightly-depressed state can be determined with high accuracy.

Figure 6:
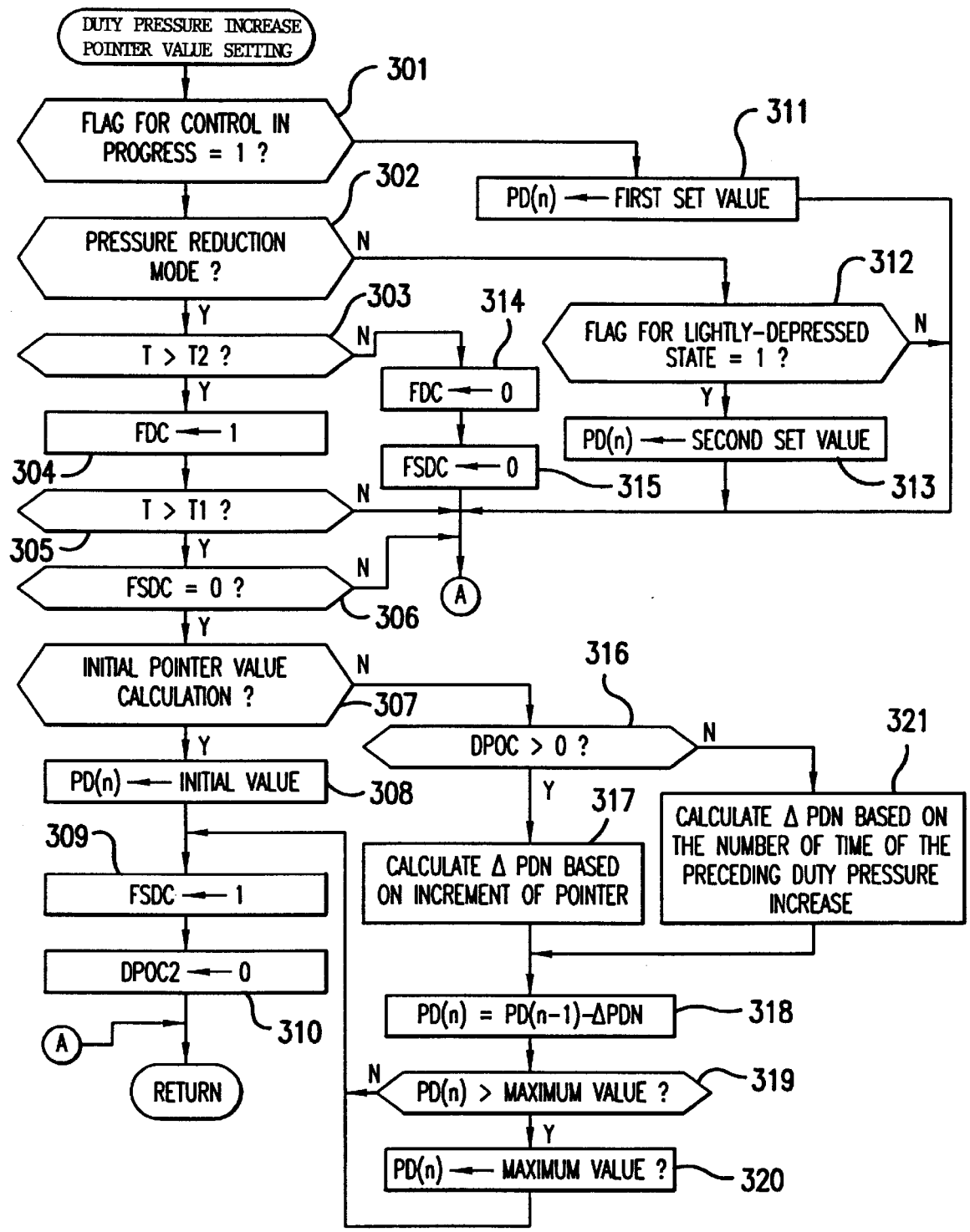
FIG. 6 is a flowchart illustrating the routine for setting the duty pressure increase pointer valve.

FIG. 6 illustrates the procedure for setting the duty pressure increase pointer value to be executed in step 110 of FIG. 4. First, in step 301, it is determined whether or not the flag indicating that control is in progress is 1. If not, the program proceeds to step 311 where the duty pressure increase pointer value PD(n) (the duty ratio that is the ratio of the duration of pressure increase to a certain period of time during the duty pressure increase control during which pressure increase and pressure reduction are repeated) is updated to a predetermined first set value (a fixed value), and the program returns to the main routine shown in FIG. 4. When the flag is determined to be 1 in step 301, the program proceeds to step 302 where it is determined whether or not the mode is the pressure reduction mode. If not, that is if the mode is the duty pressure increase mode, the program proceeds to step 312. In step 312, it is determined whether or not the flag indicating the lightly-depressed state is 1. If not, the program returns to the main routine shown in FIG. 4.

When the flag indicative of the lightly depressed state is determined to be 1 in step 312, the duty increase pointer value PD(n) is updated to the second set value (fixed value) in step 313, and the program returns to the main routine shown in FIG. 4. In this case, the second set value is larger than the first set value. Therefore, the duty pressure increase pointer value PD(n) at the time of the lightly-depressed state (i.e., at the time when the flag indicative of the lightly-depressed state is 1) is set higher than at the time of the strongly-depressed state (i.e., at the time when the flag indicative of the lightly-depressed state is 0). That is, the duty ratio during the lightly-depressed state is set so that the duration of pressure increase is longer than that made available by the duty ratio during the strongly-depressed state.

In step 302, in the case of the pressure reduction mode, the program proceeds to step 303 where it is determined whether or not the duration of the pressure reduction T is larger, for example, than a second predetermined duration T2 (e.g., 10 ms). If not, the program proceeds to step 314 where the clearance flag FDC for the counter for counting the number of times of execution of the duty pressure increase is reset to 0. In step 315, the duty pressure increase pointer value calculation termination flag FSDC is reset to 0 and the program returns to the main routine as shown in FIG. 4.

In step 303, when the duration of the pressure reduction is found to be larger than the second predetermined time, the program proceeds to step 304 where the clearance flag for the counter for counting the number of times of execution of the duty pressure increase is reset to 1, and then the program proceeds to step 305 where it is determined whether or not the pressure reduction time T is larger than a first predetermined time T1 (e.g., 20 ms). When the pressure reduction time is smaller than the first predetermined time T1, the program returns to the main routine shown in FIG. 4.

When it is determined in step 305 that the pressure reduction time T is larger than the first predetermined time T1, however, the program proceeds to step 306 where it is determined whether or not the duty pressure increase pointer value calculation termination flag FSDC is 0. If not, the program returns to the main routine shown in FIG. 4. When the duty pressure increase pointer value calculation termination flag FSDC is determined to be 0 in step 306, the program proceeds to step 307 where it is determined whether or not the pointer value calculation is the initial or first calculation. If so, the duty pressure increase pointer value PD(n) is initialized. In step 309, the duty pressure increase pointer value calculation termination flag FSDC is set to 1. In step 310, the counter DPOC for measuring the increase in the duty pressure increase pointer value is reset to 0, and the program returns to the main routine as shown in FIG. 4.

In step 307, when the calculation of the pointer is found not to be the first calculation, it is determined in step 316, whether or not the content of counter DPOC for measuring the increase of the duty pressure increase pointer value PD(n) is larger than 0. If so, the program proceeds to step 317 where the correction value Δ PDN is calculated based on the increment of the pointer value. If not, the program proceeds to step 321 where the correction value Δ PDN is calculated based on the number of times of execution of the preceding duty pressure increase (the number of times of the preceding duty pressure increase executed in the preceding duty pressure increase mode). Then, in step 318, the duty pressure increase pointer value PD(n) is found by subtracting the correction value Δ PDN from PD (n−1), the value of the preceding time for updating. In step 319, it is determined whether or not this calculated value PD(n) is larger than the predetermined maximum value. If so, the duty pressure increase pointer value PD(n) is updated to the maximum value in step 320, and the program returns to the main routine shown in FIG. 4 by way of the steps 309 and 310. In step 319, when the calculated value PD(n) is smaller than the maximum value, the program returns to the main routine shown in FIG. 4 by way of steps 309 and 310.

Figure 7:
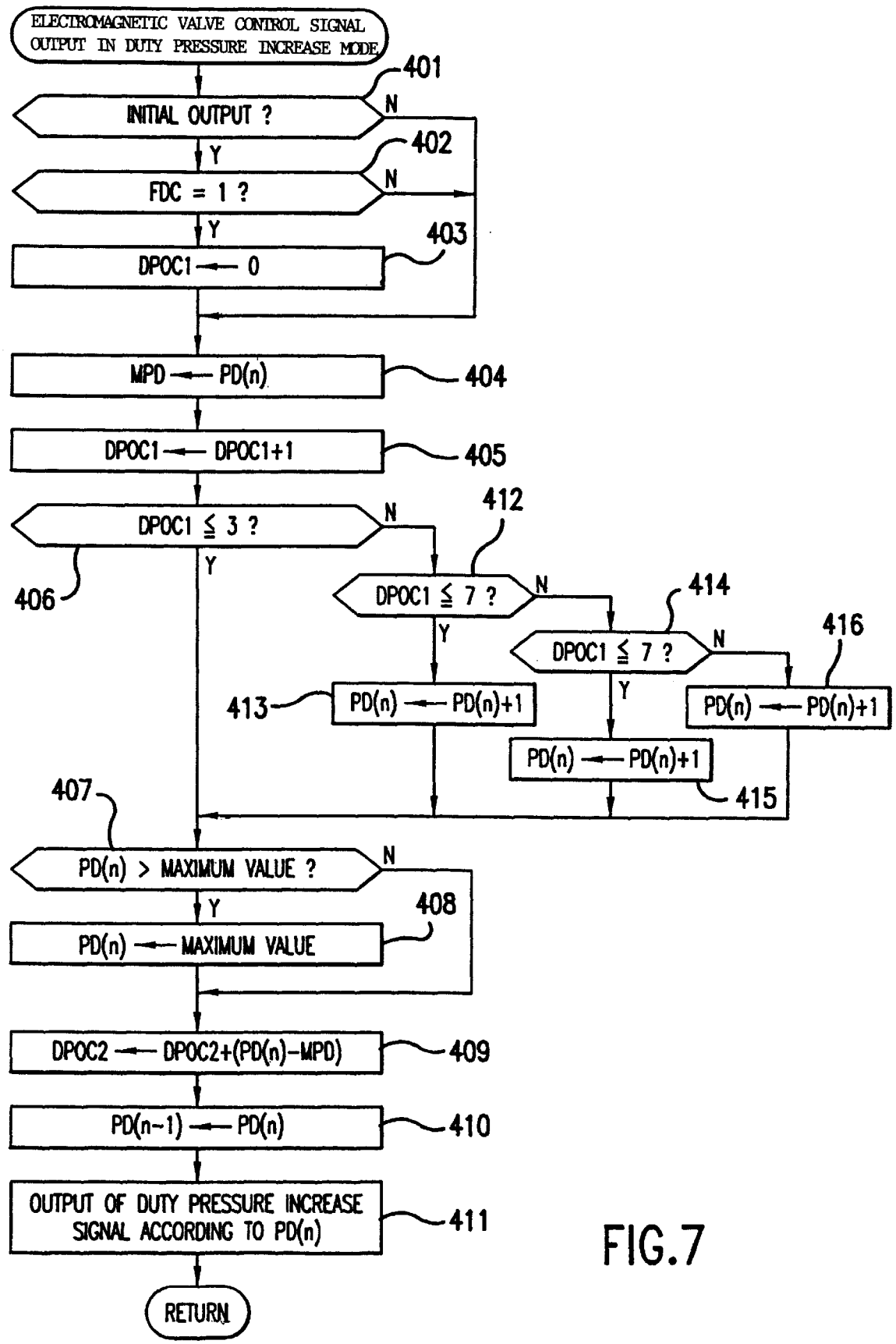
FIG. 7 is a flowchart showing the routine for outputting to the electromagnetic valve the control signal for raising the duty pressure.

FIG. 7 illustrates the routine for the electromagnetic valve control signal output in the duty pressure increase mode in connection with step 115 in FIG. 4. First, in step 401, it is determined whether or not the output signal is the initial output. If not, the program proceeds to step 404. If the output is the initial output, the program proceeds to step 402 where it is determined whether or not the clearance flag of the counter for counting the number of times of execution of the duty pressure increase is 1. If not, the program proceeds to step 404. If the clearance flag is found to be 1 in step 402, the content of the counter DPOC1 for counting the number of times of execution of the duty pressure increase is reset to 0 in step 403, and the program then proceeds to step 404. In step 404, the duty pressure increase pointer value PD(n) is stored in memory MPD for the calculation of the increment, the duty pressure increase pointer value PD(n) having been set during the operation in the previous pressure reduction mode. Subsequently, in step 405, 1 is added to the counter DPOC1 for counting the number of times of execution of the duty pressure increase. Then, in step 406, it is determined whether or not the count of the counter DPOC1 for counting the number of times of execution of the duty pressure increase is 3 or less. If so, the program proceeds to step 407. If not, the program proceeds to step 412 where it is determined whether or not the count of the counter DPOC1 for counting the number of times of execution of the duty pressure increase is 7 or less. When the count of the counter DPOC1 for counting the number of times of execution of the duty pressure increase is 7 or less, the duty pressure increase pointer value PD(n) is updated each time by adding 1 thereto in step 413. When the count of the counter DPOC1 for counting the number of times of execution of the duty pressure increase is not 7 or less, however, the program proceeds to step 414 where it is determined whether or not the count of the counter DPOC1 for counting the number of times of execution of the duty pressure increase is 11 or less. When the count of the counter DPOC1 for counting the number of times of execution of the duty pressure increase is 11 or less, the duty pressure increase pointer value PD(n) is updated each time by adding 2 thereto. When the count of the counter DPOC1 for counting the number of times of the execution of the duty pressure increase is determined to be larger than 11 in step 414, however, the duty pressure increase printer value PD(n) is updated each time by adding 3 thereto. That is, the duty pressure increase pointer value PD(n) will not be increased until the time of the third output of the duty pressure increase, but 1 will be added (to the PD(n)) each time of the 4th through 7th outputs, 2 will be added to each output of the 8th through 11th outputs; and 3 will be added to each output of the 12th and subsequent outputs.

In step 407, it is determined whether or not the duty pressure increase pointer value PD(n) is larger than the maximum value. If not, the program proceeds to step 409. If so, in step 408, the duty pressure increase pointer value PD(n) is updated to the maximum value. In step 409, the count of the counter DPOC2 for registering the increment of the duty pressure increase pointer value is updated to the value obtained by adding to the count of the DPOC2 the difference of the PD(n) and MPD. In step 410, the value for PD(n−1) obtained in the preceding step is updated again to PD(n) calculated in this step, and then in step 411, the increased duty pressure corresponding to the PD(n) calculated in this step is output, and the program returns to the main routine shown in FIG. 4.

By virtue of the present invention, several significant advantages can be realized. In one respect, when the difference between the M/C pressure and locking pressure is equal to or larger than the predetermined value, the duty ratio is set to the first set value, and when the difference is smaller than the predetermined value, the duty ratio is set to the second set value at which the duration of the duty pressure increase becomes longer than that available for the first set value. Thus, even when the difference between the M/C pressure and locking pressure varies, the gradient of the duty pressure increase can be adjusted to an appropriate gradient. Consequently, not only can the braking distance during the antiskid control be shortened, but also the locking of the wheels can be prevented to a largest possible extent.

It is possible to determine whether or not the difference between the M/C pressure and the locking pressure is equal to or larger than the predetermined value by determining whether or not the reference deceleration of the vehicle and the actual deceleration of the vehicle is equal to or larger than the predetermined level during the antiskid control. Thus, the antiskid control device of the present invention does not require any extremely expensive sensors such as an M/C pressure detection sensor or a wheel brake fluid pressure sensor, thereby allowing the cost for operating the vehicle to be reduced.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An antiskid control device comprising:

a wheel brake for applying braking force to a wheel of a vehicle;

a master cylinder for generating brake fluid pressure corresponding to depression of a brake pedal and for applying the brake fluid pressure to said wheel brake;

a pressure control valve interposed between said wheel brake and said master cylinder to control the brake fluid pressure applied to said wheel brake;

a wheel speed sensor for detecting rotational speed of the wheel; and control means for controlling said pressure control valve in response to an output signal from said wheel speed sensor to alternatively establish a duty-cycle pressure-increase mode operation for increasing the brake fluid pressure in said wheel brake gradually and a pressure-decreasing mode operation for decreasing the brake fluid pressure in said wheel brake;

said control means comprising:

means for indicating whether or not a difference between the brake fluid pressure generated by said master cylinder and a locking pressure which causes said wheel to be locked is larger than a predetermined value;

duty ratio setting means for setting a duty ratio in the duty-cycle pressure-increase mode operation to a first set value if the means for indicating that the difference is larger than the predetermined value and for setting the duty ratio to a second set value which causes a pressure increase operation to last longer than in the case of the first set value if the means for indicating indicates that the difference is smaller than the predetermined value; and duty pressure increasing means for controlling said pressure control valve in order to increase the brake fluid pressure in said wheel brake according to the duty ratio set by said duty ratio setting means.

2. An antiskid control device according to claim 1, wherein said means for indicating comprises vehicle deceleration detection means for detecting a variation in vehicle deceleration, and comparing means for comparing the variation detected by the vehicle deceleration detection means to a predetermined deceleration, the comparing means determining that said difference is larger than the predetermined value if the variation is smaller than the predetermined deceleration and that said difference is smaller than the predetermined value if the variation is larger than the predetermined deceleration.

3. An antiskid device according to claim 1, including a plurality of wheel brakes for applying a braking force to respective wheels of a vehicle, and a plurality of pressure control valves each interposed between one of the wheel brakes and the master cylinder to control the brake fluid pressure applied to the respective wheel brakes.

4. An antiskid control device according to claim 3, including a plurality of wheel speed sensors which each detects the rotational speed of one of the wheels of the vehicle.

5. An antiskid control device according to claim 2, wherein said vehicle deceleration detection means includes a deceleration sensor for detecting a present deceleration of the vehicle, reference setting means for setting the present vehicle deceleration as a reference value instantaneously following an initial setting of said duty-cycle pressure-increase mode operation, and variation calculation means for setting a difference between the reference value and the present deceleration as said variation of the vehicle deceleration.

6. An antiskid control device comprising:

a wheel brake for applying braking force to a wheel of a vehicle;

a master cylinder for generating brake fluid pressure corresponding to depression of a brake pedal and for applying the brake fluid pressure to said wheel brake;

a pressure control valve interposed between said wheel brake and said master cylinder to control the brake fluid pressure applied to said wheel brake;

a wheel speed sensor for detecting rotational speed of said wheel;

a vehicle deceleration sensor for detecting vehicle deceleration of the vehicle; and control means for controlling said pressure control valve in response to an output signal from said wheel speed sensor to alternatively establish a duty-cycle pressure-increase mode operation for increasing the brake fluid pressure in said wheel brake gradually and a pressure-decreasing mode operation for decreasing the brake fluid pressure in said wheel brake;

said control means comprising:

means for determining whether a difference between a vehicle deceleration reference value and the vehicle deceleration detected by the vehicle deceleration sensor is larger than a predetermined first value; and means for indicating that a difference between the brake fluid pressure generated by said master cylinder and a locking pressure which causes the wheel to be locked is less than a predetermined second value when the difference between the vehicle deceleration reference value and the vehicle deceleration detected by the vehicle deceleration sensor is larger than the predetermined first value and for indicating that the difference between the brake fluid pressure generated by said master cylinder and the locking pressure which causes the wheel to be locked is greater than the predetermined second value when the difference between the vehicle deceleration reference value and the vehicle deceleration detected by the vehicle deceleration sensor is smaller than the predetermined first value.

7. An antiskid control device according to claim 6, wherein said means for indicating whether a difference between the vehicle deceleration reference value and the vehicle deceleration detected by the vehicle deceleration sensor is larger than a predetermined first value includes vehicle deceleration detection means for detecting a variation in vehicle deceleration, and comparing means for comparing the variation detected by the vehicle deceleration detection means to a predetermined deceleration.

* * * * *